United States Patent
Sickels

[15] 3,658,684
[45] Apr. 25, 1972

[54] ELECTROCHEMICAL MACHINING APPARATUS

[72] Inventor: David W. Sickels, Plymouth, Mich.
[73] Assignee: Electrogenics, Inc., Detroit, Mich.
[22] Filed: Oct. 13, 1969
[21] Appl. No.: 865,875

[52] U.S. Cl. ...........................204/275, 204/224, 204/297 R
[51] Int. Cl. .........................................B01k 3/04, B23p 1/04
[58] Field of Search ..........204/224, 297, 206, 143 R, 143 M, 204/286, 275

[56] References Cited

UNITED STATES PATENTS

| | | | |
|---|---|---|---|
| 3,399,130 | 8/1968 | Lovekin | 204/206 |
| 3,475,303 | 10/1969 | Sadler et al. | 204/143 M |
| 3,438,880 | 4/1969 | Martin | 204/279 X |
| 3,466,235 | 9/1969 | Williams | 204/224 X |

FOREIGN PATENTS OR APPLICATIONS 1,005,458  9/1965  Great Britain..........................204/224

Primary Examiner—John H. Mack
Assistant Examiner—D. R. Valentine
Attorney—Cullen, Settle, Sloman & Cantor

[57] ABSTRACT

Electrochemical machining apparatus for a flat electroconductive workpiece having a peripheral edge to be deburred or radiused. The apparatus has a non-conductive base, and a non-conductive mask, on which the workpiece is seated, mounted on the base. An electrode rests on the base and its interior wall conforms to the shape of and surrounds the mask and the peripheral edge of the workpiece. The electrode has a pair of lips extending from the interior wall thereof which are in spaced relation from the peripheral edge of the workpiece. The electrode is connected to the negative terminal of a direct current power source.

A non-conductive cover overlies the base. The cover has a non-conductive mask, for the top side of the workpiece, mounted on the underneath side thereof. The faces of the mask on the base and the mask on the underneath side of the cover conform in shape to the workpiece and are sized slightly smaller leaving only the peripheral edge of the workpiece exposed.

Conduit means are provided in the apparatus for channeling electrolyte between the peripheral edge of the workpiece and the inner wall of the electrode surrounding the peripheral edge.

5 Claims, 6 Drawing Figures

Patented April 25, 1972

INVENTOR.
DAVID W. SICKELS
BY
CULLEN, SETTLE, SLOMAN & CANTOR.

ATT'YS.

INVENTOR.
DAVID W. SICKELS
BY
CULLEN, SETTLE, SLOMAN & CANTOR.

ATT'YS.

Patented April 25, 1972

INVENTOR.
DAVID W. SICKELS
BY
CULLEN, SETTLE, SLOMAN
& CANTOR.
ATT'YS.

… (3,658,684)

ELECTROCHEMICAL MACHINING APPARATUS

BACKGROUND OF THE INVENTION

This invention relates to apparatus for electrochemically deburring or radiusing metallic parts of complicated shape.

Electrochemical machining of metallic parts is a fairly new development in the metal working field. The technique is used to cut and shape metal parts, as well as deburr them. It is particularly suitable for use with small stamped or machined parts of complicated design where it is difficult, if not impossible, to remove the burrs left on by the stamping or machining operation. Metal removal is accomplished by means of electrolysis. Conventionally, direct current is applied between two pieces of metal submerged or in contact with a suitable electrolyte. One of the pieces, the workpiece from which removal of metal is desired, is made the anode, and the other piece is made the cathode. The cathode is especially designed to function best with the specific workpiece being operated upon. The electrolyte is continuously circulated and is made to flow sufficiently fast that it carries the metal ions given off from the anode with it, and hydrogen gas is generated at the cathode.

The most commonly used electrolyte is a water solution of sodium chloride, although other electrolytes can be used.

When direct current is applied between the electrodes, it flows between the anode metal workpiece and the cathode along the paths of least resistance, the high points on the workpiece. Metal is removed by anodic deplating. Since more metal is removed at points of greatest current flow, the high points on the workpiece will be removed first, thus smoothing out or deburring the workpiece. At the finish there is substantially equal current density at all points.

The basic principles of electrochemical machining are well known to those skilled in the art.

Because each workpiece to be machined or deburred is in general, a unique shape, and because apparatus designed to be used with workpieces of one shape cannot be used efficiently or accurately with workpieces of another shape, new apparatus for use in conjunction with each distinctly shaped workpiece must be invented.

Electrochemical machining apparatus is contemplated for rapidly and efficiently deburring and radiusing workpieces.

Also contemplated is electrochemical machining apparatus which facilitates rapid loading and unloading of the workpieces so that the deburring can be carried out.

Further contemplated is electrochemical machining apparatus that clamps workpieces in such a way as to protect already machined surfaces or surfaces which are not to be machined and also in a unique way incorporates the workpieces into the machining circuit.

More specifically contemplated is electrochemical machining apparatus incorporating a unique electrode structure that delivers both current and electrolyte to the areas to be deburred without concern for secondary machining effects.

Also, an objective is electrochemical machining apparatus having novel provision for not only retaining and locating the workpieces but also unique provision for distributing the electrolyte to the surfaces to be deburred.

The foregoing and other objects and advantages of the invention will become apparent from the following description and accompanying drawings, in which.

The electrochemical machining apparatus of this invention is suitable for use in deburring and radiusing a flapper valve or similar flat metallic piece having a peripheral edge which needs to be deburred and/or radiused. In order that the apparatus of the invention will be more easily understood, a flapper valve will first be described.

Figure 6:
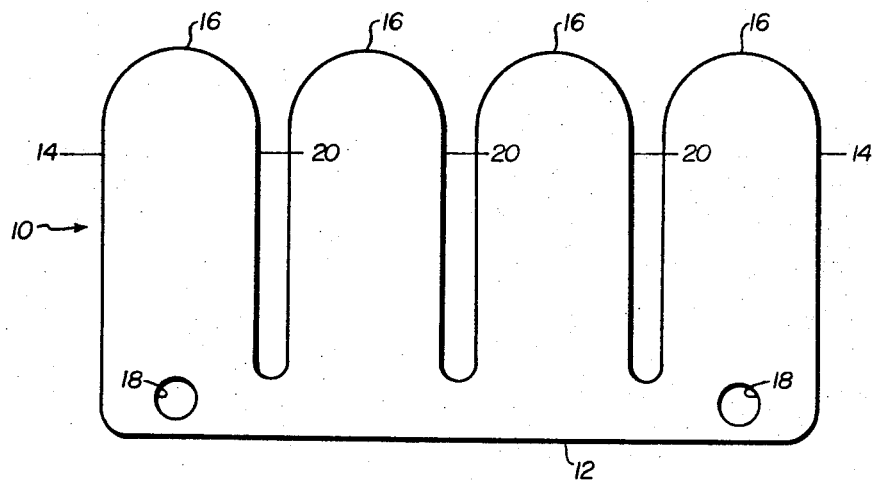
FIG. 6 is a top view of a workpiece to be deburred and radiused in the apparatus of the invention.
Figure 5:
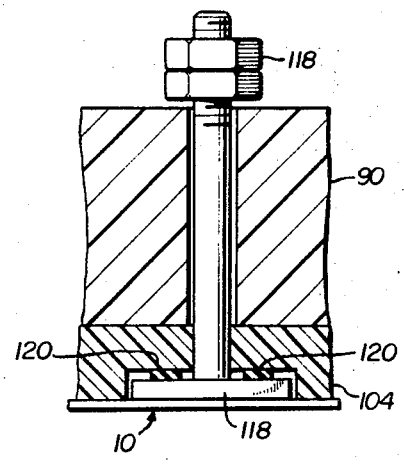
FIG. 5 is a view through the line 5—5 of FIG. 2.

A flapper valve 10 is shown in FIG. 6. This valve is conventionally used in outboard engines and comprises a base section 12 having a plurality of spaced apart lobes 14 with rounded ends 16, extending therefrom. The base section 12 has apertures 18 in it, located at the bottoms of the end lobes 14. Each lobe 14 is separated from the adjacent lobe 14 by a slot 20.

The valve 10 is ordinarily stamped out of sheet metal. The stamping operation leaves burrs on the edge of the valve 10 which need to be removed. In addition, vibration of the valve 10 during use causes stress to develop at sharp corners, and the valve 10 eventually cracks. The stress can be avoided by radiusing off the peripheral edge.

DESCRIPTION OF THE PREFERRED EMBODIMENT

The electrochemical deburring apparatus 22 of this invention comprises a rectangular non-conductive base 24, preferably made of plastic, having a horizontal bore 26 in the front portion and a horizontal conduit 28 in the rear portion at a level above the horizontal bore 26. The horizontal conduit 28 communicates with a plurality of spaced apart vertical conduit 30 which open into a recess 32 in the top surface of the base 24. The base 24 has two vertical bores 34, each of which has a lower enlarged diameter section 36 and an upper reduced diameter section 38, separated by an internal shoulder 40. The enlarged diameter sections 36 of the bores 34 are intersected by the horizontal bore 26.

A rotatable rod 42 is set in the horizontal bore 26. Two transverse grooves 44 having inclined troughs (not shown) are cut in the rod 42 for purposes described hereafter. The rod 42 extends beyond the base 24 at both ends and is held in place in the base 24 by a pair of pins 46 fixed therein, one at each side of the base 24. A handle 48 is attached to one end of the rod.

A vertically situated workpiece positioning pin 50 is spring mounted in each bore 34 above the horizontal rod 42. The lower ends of the vertical pins 50 fit within the grooves 44 in the rod 42. The vertical pins 50 are spring loaded in the bores 34 by means of a spring 52 surrounding each pin 50 which is biased between the internal shoulder 40 of the bore 34 and a horizontal lug 54 through the lower end of each pin 50. When the horizontal rod 42 is rotated by means of the handle 48, the vertical pins 50 rise or fall in accordance with the depth of the grooves 44 in the horizontal rod 42.

A plurality of alternating parallel wide rectangular blocks 56 and narrow rectangular blocks 58 are mounted on the floor of the recess 32 in the top surface of the base 24. The wide and narrow blocks 56 and 58 are separated from each other by the space of the recess. Grooves 60 (see FIG. 4) are thus formed between adjacent blocks 56 and 58 and between the blocks 56 or 58 and the side walls of the recess 32. The outer wide blocks 56 have bores 62 therein which have the same axis as the vertical bores 34 in the base, and the same diameters as the upper reduced diameter sections 38.

A non-conductive mask 64 is mounted on the blocks 56. The mask 64 comprises a base section 66 with a plurality of lobes 68 extending therefrom. Each lobe 68 and a portion of the base 66 rests on a wide block 56, and the slots 20 in the flapper valve 10 are vertically aligned with the narrow blocks 58. The lobes 68 are substantially trapezoidal shaped in cross-section (see FIG. 4). The mask 64 has a top surface or face 70 which conforms in shape to the shape of the flapper valve 10 except that it is slightly smaller in peripheral dimension, a bottom surface 72 which is substantially less in cross-sectional width than the top surface 70, and side walls 74 which slope outwardly from the bottom surface 72 to the top surface 70. The edges of the flapper valve 10 extend slightly beyond the edges of the face 70.

The mask 64 has bores 76 therein having the same axis as the bores 62, 34 in the blocks 56 and the base 24, respectively, through which the pins 50 extend. The flapper valve 10 is placed on top of the mask 64. The pins 50 project through the aperatures 18 in the flapper valve 10 when they are in raised position.

A hollowed out electrode 76 having a removable front member 78 and an inner wall 80 conforming to the shape of the flapper valve 10, is mounted on top of the base 24. The front member 78, which is electrically connected to the main part of the electrode 76, is removed whenever it is desired to remove the flapper valve 10 from the mask 64. The mask 64 and the surface of the electrode 76 under the front member are on the same plane. The flapper valve 10 is then removed by sliding it forward. The electrode 76 has a plurality of projections 82 which fit into the slots 20 between the lobes 14 of the flapper valve 10. The projections 82 rest on the narrow blocks 58. The inner wall 80 of the electrode completely surrounds the mask 64 and the peripheral edge of the flapper valve 10.

Figure 1:
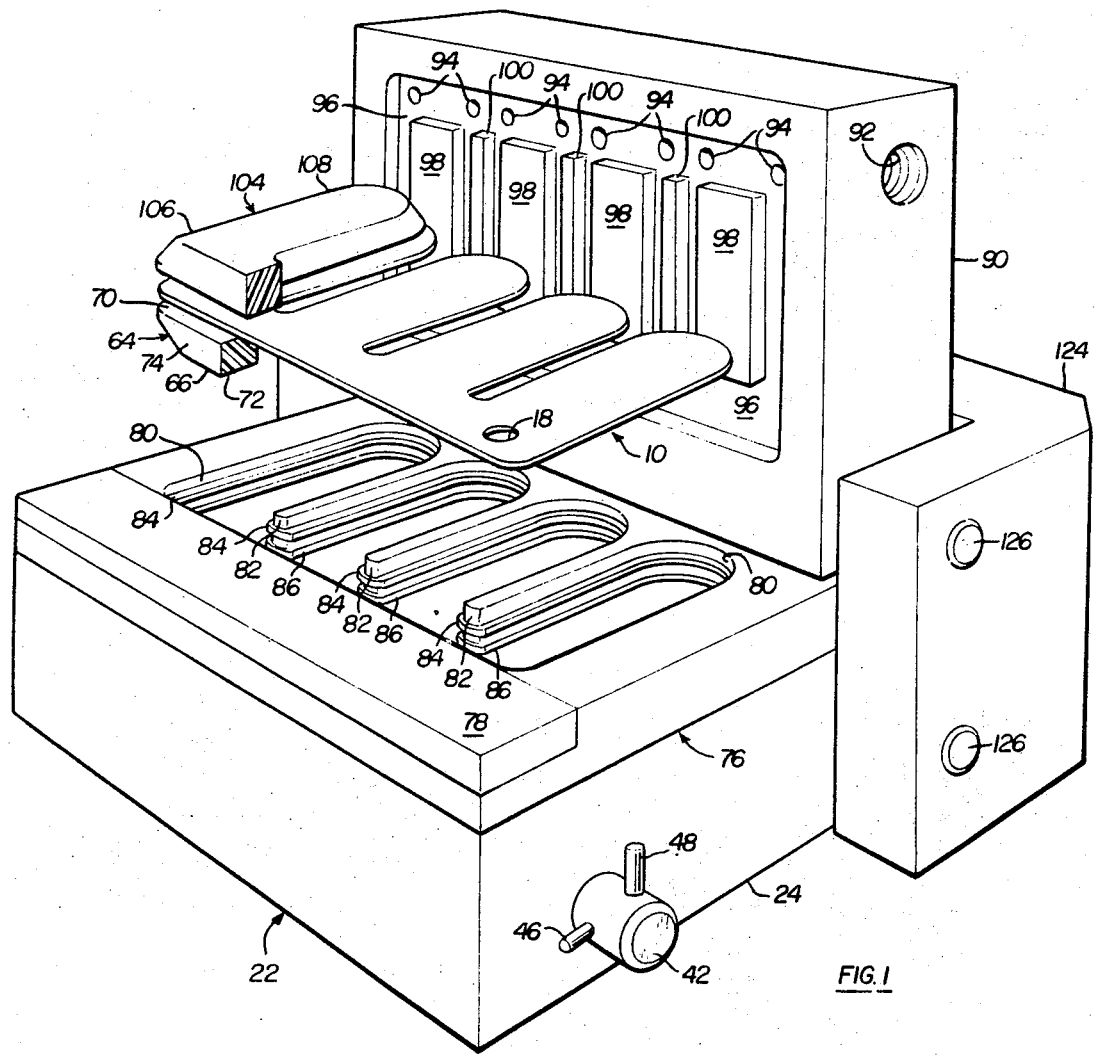
FIG. 1 is a perspective view of the apparatus of the invention.
Figure 2:
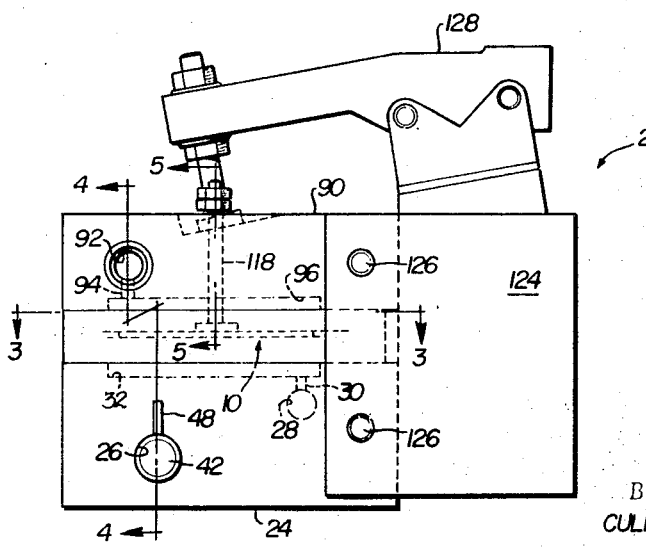
FIG. 2 is a side view, with parts in phantom of the apparatus of the invention.
Figure 3:
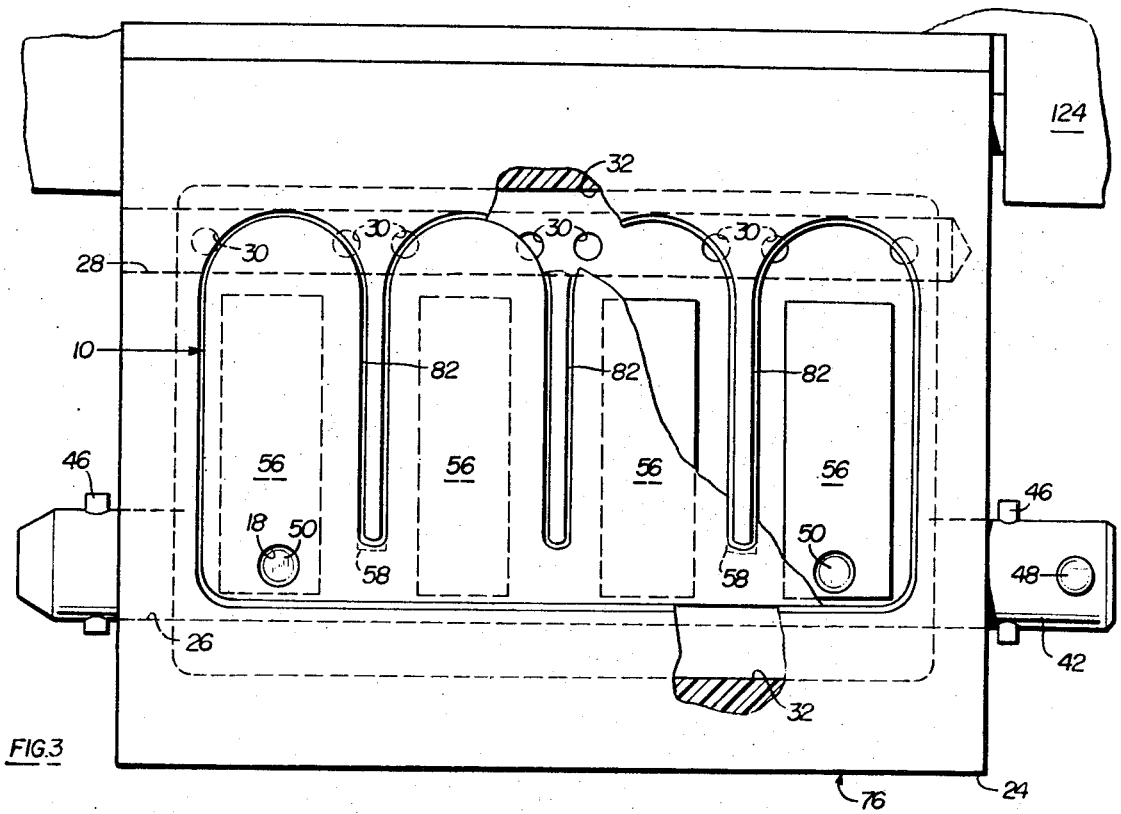
FIG. 3 is a view through the line 3—3 of FIG. 2.
Figure 4:
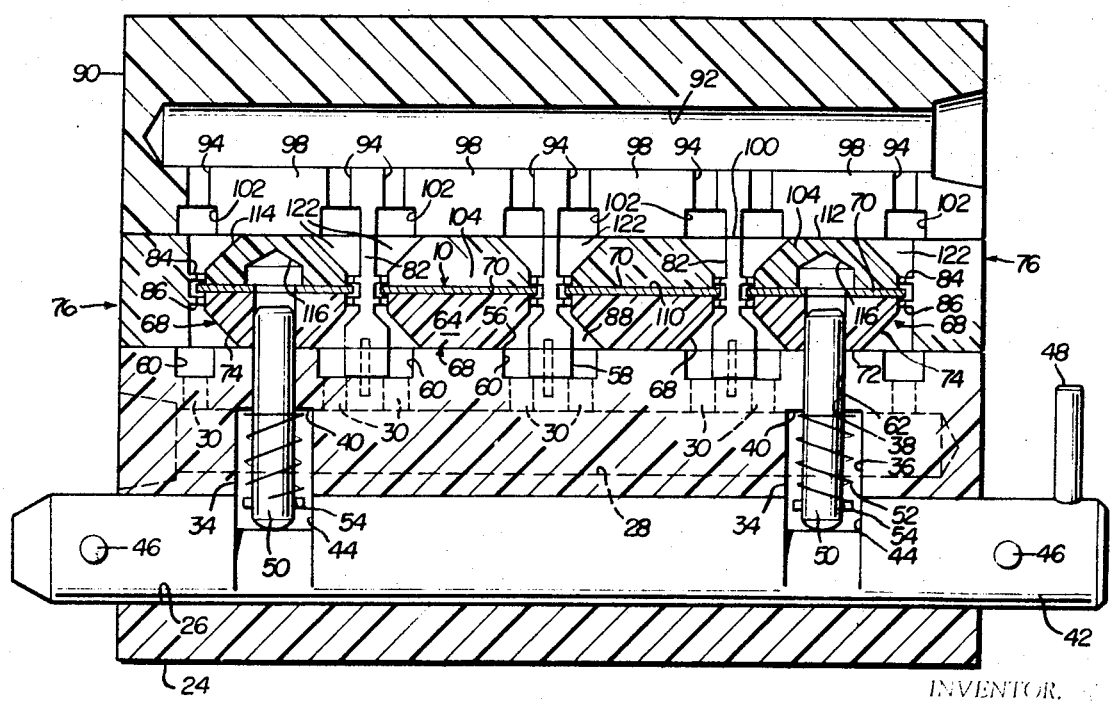
FIG. 4 is a view through the line 4—4 of FIG. 2.

As best seen in FIGS. 1 and 4, the inner wall 80 has an outwardly extending lip 84 located at a level slightly above the top of the edge of the flapper valve 10, and another outwardly extending lip 86 located at a level slightly lower than the bottom of the edge of the flapper valve 10. Optimum results are achieved when each lip 84 and 86 is located about 0.020 inch distance from the edge of the flapper valve 10 from a vertical or horizontal direction.

The inner wall 80 of the electrode 76 around the flapper valve 10, except for the lips 84 and 86, is coated with a non-conductive epoxy plastic. This insures that current travels from the lips 84 and 86 to the edge of the flapper valve 10, rather than from any other part of the electrode 76. The electrode 76 is connected to the negative terminal of a direct current power source (not shown).

Channels 88 are defined by the opposed inner wall 80 of the electrode 76 and the sloping walls 74 of the mask 64. Each channel 88 communicates with one of the vertical conduits 30 in the base 24 which opens into the recess 32 in the top surface of the base 24.

A non-conductive cover 90 is mounted over the base 24. The cover 90 has a horizontal conduit 92 which communicates with a plurality of downwardly positioned conduits 94 which open into a recess 96 in the underside of the cover 90.

A plurality of alternating parallel wide rectangular blocks 98 and narrow rectangular blocks 100 are mounted in the recess 96 in the under surface of the cover 90. The wide and narrow blocks 98 and 100 are separated from each other by the space of the recess 96, thus in effect the space becomes grooves 102 between the blocks 98 and 100, and between the blocks 98 and the side wall of the recess 96 (see FIG. 4). The upper surface of the projections 82 of the electrode 76 and the exposed surface of the narrow blocks 98 abut each other when the cover 90 is closed. If desired, the recess 32 in the base 24, and recess 96 in the cover 90 can be machined out of the surface of the base or cover, leaving the blocks 56 and 58, or 98 and 100 intact, as a part of the base 24 or cover 90, respectively.

A non-conductive upper mask 104 is mounted on the wide blocks 98 attached to the cover 90. The mask 104 comprises a base section 106 with a plurality of lobes 108 extending therefrom. Each lobe 108 and a portion of the base section 106 rests on a wide block 98. The lobes 108 are substantially trapezoidal shaped in cross-section. The mask 104 has a bottom surface or face 110 which conforms in shape to the shape of the flapper valve 10, a top surface 112 which is substantially less in cross-sectional width than the bottom surface 110, and side walls 114 which slope outwardly from the top surface 112 to the bottom surface 110. The face 110 is slightly smaller in peripheral dimension than the flapper valve 10.

The mask 104 has recesses 116 for receiving the pins 50 projecting upwardly from the bores 34.

A positive contact 118 is mounted on the cover 90 and opens into the face of the mask 104. Compressible rubber pads 120 are interposed between the contact 118 and the mask 104. The contact 118 is connected to the positive terminal of a direct current power source. When the cover 90 is closed, the flapper valve 10 is engaged with the contact 118 and becomes the anode of the apparatus.

When the flapper valve 10 is placed on the lower mask 64, it is positioned thereon by the vertical pins 50 extending through the aperatures 18 in the valve 10. When the cover 90 is closed, the pins 50 extend into the recesses 116 in the upper mask 104, thus securely fixing the valve 10 in place. The pins 50 are retracted when it is desired to remove the flapper valve 10 from the apparatus.

Channels 122 are also defined by the sloping walls 114 of the upper mask 104 and inner wall 80 of the electrode 76. Each channel 122 communicates with one of conduits 94 in the cover 90 opening into the recess 96 in the underside thereof, by means of a groove 102.

The base 24 and cover 90 are held in position on a U-shaped support member 124 by means of set screws 126 which extend through the legs of the support member 124 and against the base 24 and the cover 90, respectively. A toggle clamp 128 is mounted on the top of the support member 124 for holding the cover 90 in place on the base 24.

In operation, electrolyte is pumped through the conduit 28 in the base 24 into the vertical conduits 30 which empty into the grooves 60 and channels 88 between the lower mask 64 and the electrode 76. It flows into the gaps between the edge of the flapper valve 10 and the electrode 76, then into the channels 122 between the upper mask 104 and the electrode 76, up through the grooves 102 and the vertical conduits 94 in the cover 90 and into the horizontal conduit 92. From the horizontal conduit 92 the electrolyte is returned to a storage tank (not shown). When current is passed between the flapper valve 10 and the lips 84 and 86 of the electrode 76, deburring and radiusing takes place. The masks 64 and 104 prevent all except the peripheral edge of the flapper valve 10 from being subjected to electrolytic action by the electrolyte.

In a specific example, a flapper valve having a thickness of 0.06 inch was deburred and radiused around its periphery with the apparatus as shown in the drawings. An aqueous solution of sodium chloride was used as the electrolyte. The temperature of the electrolyte was 94° F. It was pumped through the apparatus under a pressure of 28 p.s.i.g., and at a rate of about 2.5 gallons per minute. A direct current of about 80 amps was passed between the electrode and the flapper valve at a potential of 18 volts. The electrolytic gap in a vertical and horizontal direction between the lips of the electrode and the edge of the flapper valve was 0.020 inch. The finished flapper valve had a smooth burr-free radiused edge.

I claim:

1. Electrochemical machining apparatus for a flat workpiece having a peripheral edge to be treated, comprising a non-conductive support means for said workpiece which encloses and masks all but said peripheral edge thereof, an electrode connected to the negative terminal of a direct current power source positioned on said support means and surrounding said peripheral edge of said workpiece a spaced distance therefrom, said electrode having a pair of lips projecting toward said peripheral edge of said workpiece, one at a level above said peripheral edge and one at a level below said peripheral edge, the space between said lips and said workpiece comprising the electrolytic gap, means connecting said workpiece with the positive terminal of a direct current power source, and means for flowing electrolyte through said electrolytic gap.

2. Electrochemical deburring apparatus for a flat workpiece which has a peripheral edge to be deburred, comprising a non-conductive support base, a non-conductive mask for the lower surface of the workpiece mounted on said base, upon which the workpiece rests, the surface of said mask adjacent the lower surface of the workpiece conforming in shape to the workpiece and sized slightly smaller leaving the peripheral edge of the workpiece exposed, an electrode connected to the negative terminal of a direct current power source positioned on said support base and surrounding the peripheral edge of the workpiece, said electrode having a pair of lips projecting toward the peripheral edge of the workpiece, one at a level below the peripheral edge, one at a level above the peripheral edge, and which are equally spaced from the peripheral edge, the space between said lips and the peripheral edge of said workpiece comprising an electrolytic gap, means defining a channel between said mask mounted on said base and said electrode, conduit means in said base for conducting electrolyte fluid to said channel, means for fixedly positioning the workpiece on said mask, a cover overlying said base and the workpiece, a non-conductive mask mounted on the under side of said cover for masking the upper surface of the workpiece leaving the peripheral edge exposed, means in the cover for connecting the workpiece to the positive terminal of a direct current power source, means defining a channel between said upper mask and said electrode, said cover having conduit means for conveying electrolyte from said channel, and means for holding said cover on said base.

3. The apparatus of claim 2 wherein the means for positioning said workpiece is a pair of spring loaded pins which are actuated by a rod in said support base and extend upwardly through said support base and said mask mounted on said support base through orifices in the workpiece, into recesses in said mask attached to said cover, thus fixedly positioning the workpiece in relation to the apparatus.

4. The apparatus of claim 2 wherein the means for holding said cover over said workpiece is a toggle clamp attached to a support and biased against said cover.

5. The apparatus of claim 2 wherein the vertical and horizontal distance between said lips and said peripheral edge of said workpiece is 0.020 inch.

* * * * *